May 6, 1958  C. J. DORF  2,833,121
APPARATUS FOR VAPORIZING VOLATILE LIQUIDS
Filed Nov. 24, 1953  2 Sheets-Sheet 2
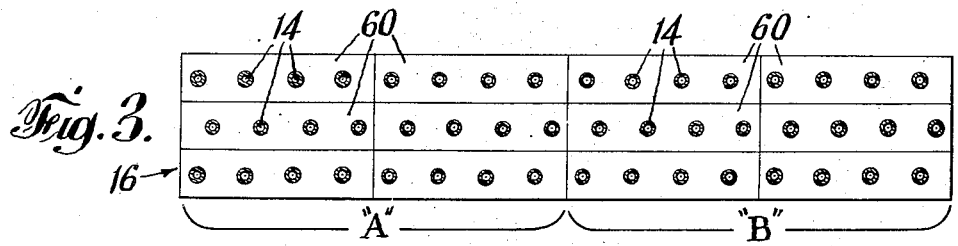
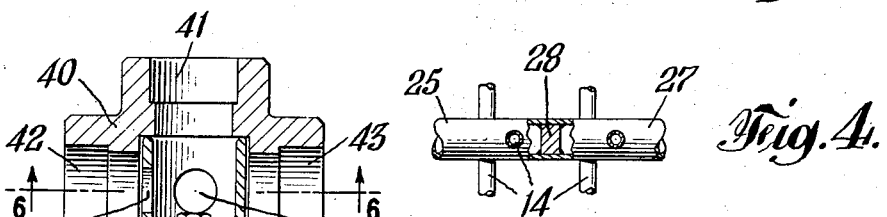
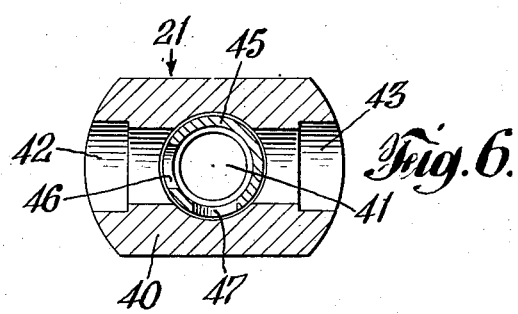
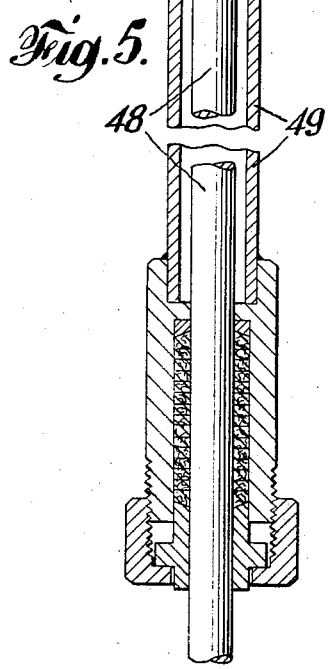
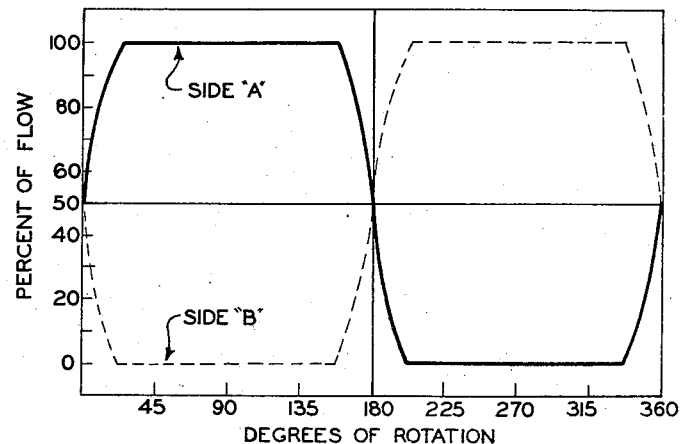
INVENTOR
CHARLES J. DORF
BY
William F. Mesinger
ATTORNEY

United States Patent Office 2,833,121
Patented May 6, 1958

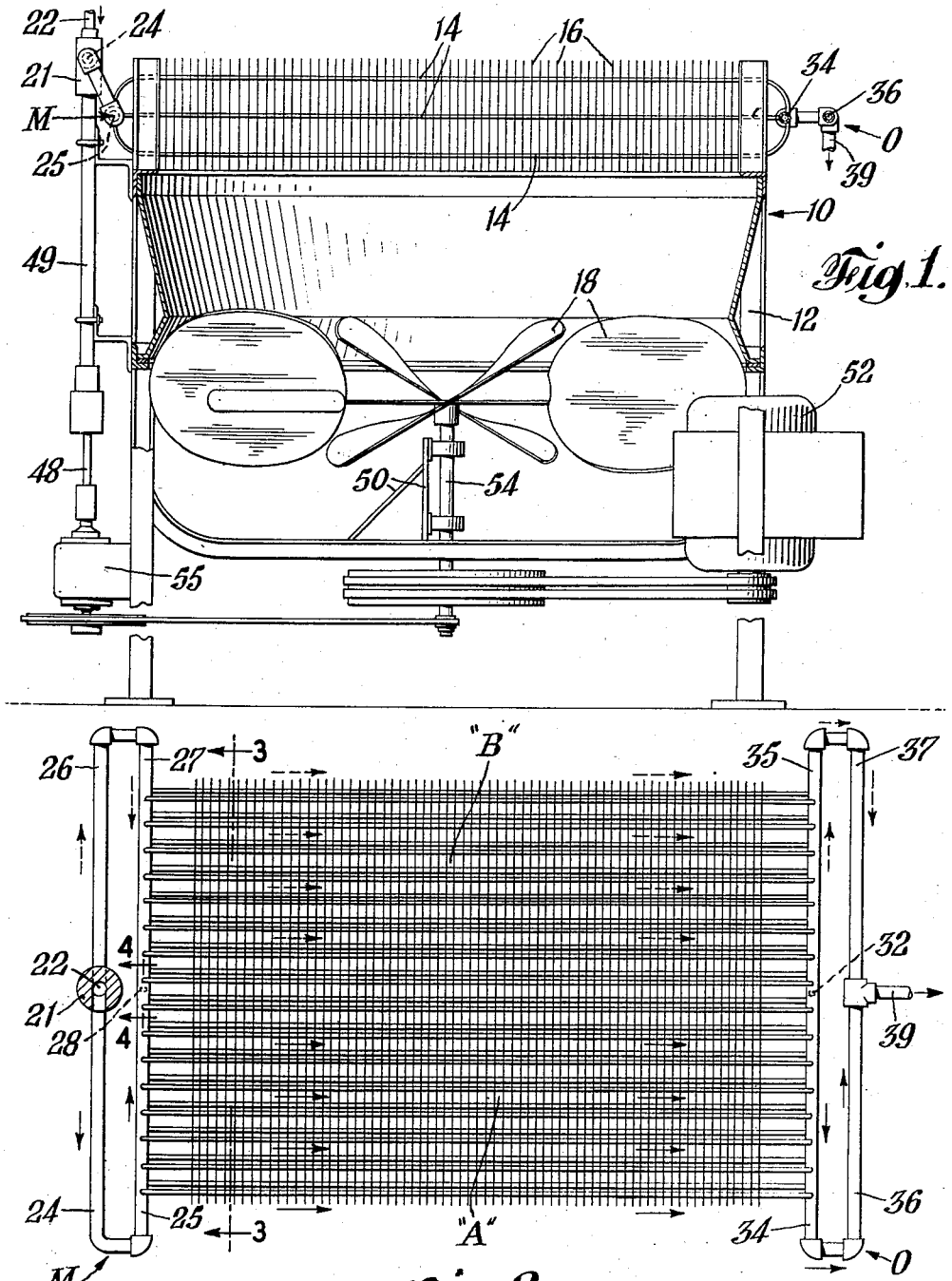

2,833,121
APPARATUS FOR VAPORIZING VOLATILE LIQUIDS

Charles J. Dorf, Indianapolis, Ind., assignor to Union Carbide Corporation, a corporation of New York Application November 24, 1953, Serial No. 394,184

6 Claims. (Cl. 62—1)

The present invention relates to apparatus for vaporizing volatile liquids and, more particularly, to apparatus which employs atmospheric air for vaporizing such volatile liquids as oxygen, nitrogen and the like, having boiling points below about 233° K. at atmospheric pressure.

Heretofore, volatile liquids have generally been transformed from a liquid state to a gaseous state in heat exchange apparatus employing steam or electric heating means. The high cost of maintaining such prior apparatus dictates the need for apparatus employing an inexpensive and readily available heating medium such as atmospheric air.

Atmospheric vaporizers of the finned-tube type have been proposed and employed, but have been subject to operating difficulties under certain atmospheric operating conditions. Due to their size and conditions of use, atmospheric vaporizers are usually located out-of-doors where, during periods of the winter, atmospheric conditions are encountered wherein the air temperature and relative humidity are such as to cause ice and frost deposits on the coils and fins of finned-tube type atmospheric vaporizers.

Prior finned-tube atmospheric vaporizers have been designed with short fins to maintain a constant temperature from the tube wall to the fin tip and give a very efficient operation during normal atmospheric conditions. However, when severe atmospheric operating temperatures are encountered these short fins and the interspaces between them are completely covered with frost and ice, thereby causing a failure in heat transfer and a consequent failure in vaporization of the volatile liquid.

It is, therefore, an object of the present invention to provide an atmospheric vaporizer of the finned-tube type which will successfully operate with efficiency even under the most severe operating conditions.

A further object is to provide an atmospheric vaporizer which is simple and rugged in construction and which has a size and weight sufficiently small to provide for ease in portability.

Other aims and advantages of the invention will be apparent from the following description and appended claims.

In the accompany drawings:

Fig. 1 is a vertical sectional view of a finned-tube type atmospheric vaporizer embodying the invention;

Fig. 2 is a plan view of the tube and fin arrangement of the vaporizer of Fig. 1, showing the flow path of the fluid therethrough;

Fig. 3 is a sectional view taken along the line 3—3 of Fig. 2, showing tube and fin arrangement;

Fig. 4 is a view taken along the line 4—4 of Fig. 2, parts having been broken away to show internal construction;

Fig. 5 is a detailed elevationed sectional view of the three-way valve employed in the embodiment of Fig. 1;

Fig. 6 is a sectional view taken along the lines 6—6 of Fig. 5; and

Fig. 7 is a graph showing the percentage of total flow of volatile liquid through each side of the vaporizer with respect to the position of the rotating three-way valve.

In accordance with the present invention, and referring to the drawings, an atmospheric vaporizer 10 is provided comprising supporting frame 12, a plurality of heat conducting tubes or conduits 14 of copper, aluminum or other suitable material, a plurality of spaced parallel fins 16 of copper, aluminum or other suitable heat conducting material secured in heat transfer relation with the tubes, such as by soldering or brazing, and a fan 18 positioned at one end for forcing a stream of atmospheric air through the spaces between the plurality of tubes 14 and fins 16.

Volatile liquid inlet means, including inlet manifold M, is provided at one end of vaporizer 10 and includes a three-way valve 21 for controlling the direction flow of volatile liquid into the vaporizer. Any suitable equivalent valve means, such as a pair of poppet valves, may alternatively be employed. This valve is located in the inlet line 22 and by its positioning determines whether volatile liquid shall pass through conduit 24 to side 25 of inlet manifold M, or whether it shall pass through conduit 26 to side 27 of inlet manifold M.

Plug 28, shown in detail in Fig. 4 of the drawings, is provided at the internal midpoint of inlet manifold M thereby forming two volatile liquid manifolds 25 and 27. Volatile liquid passes from the inlet manifolds through the tubes 14 of the vaporizer. These tubes are preferably arranged in multiple tiers, as shown in Figs. 1 and 3 of the drawings.

At the outlet end of vaporizer 10 outlet means are provided including an outlet manifold O into which the plurality of tubes 14 pass the vaporized liquid. If desired, manifold O may also be provided, at its internal midpoint, with a plug 32 which forms two outlet manifold sections 34 and 35. Vaporized liquid passing through outlet manifold sections 34 and 35 will then pass through conduits 36 or 37, respectively, which join to form outlet line 39. Even without plug 32 vaporizer 10 will operate in divided sections due to the inlet manifold arrangement.

With the arrangement as described above, the vaporizer 10 is operatively divided into two sections. The section operating at any given time depends on the positioning of three-way valve 21, such as that shown in detail in Figs. 5 and 6 of the drawings. Valve 21 comprises a casing 40 having an inlet conduit 41 at the top thereof and two outlet conduits 42 and 43 in the horizontal plane at the sides thereof. Valve plug 45 is arranged to rotate about its vertical axis and is provided with ports 46 and 47 angularly spaced in the horizontal plane and adapted to periodically and alternately pass fluid from inlet conduit 41, through valve plug 45, to outlet conduits 42 and 43. Rotation of valve plug 45 is accomplished by rotating drive stem 48 enclosed in non-rotating stem housing 49.

Atmospheric air is forced through the spaces between tubes 14 and fins 16 by means of fan 18 secured to supporting frame 12 by support means 50. A motor 52 is suitably mounted on frame 12 and is belted to fan shaft 54. Motor 52 also drives speed reducer 55 which, in turn, drives rotating stem 48 of three-way valve 21. The high speed of rotation of motor 52 is greatly reduced by speed reducer 55 so that valve plug 45 completes one cycle of rotation approximately every half hour. In this manner alternate sides of the atmospheric vaporizer are in operation for alternate periods of time of the order of about 15 minutes. Fig. 7 of the drawings shows the percent of total flow for alternate sides, A and B, of vaporizer 10 with respect to angular rotation of valve plug 45.

It can, therefore, be seen that, as alternate sides of the vaporizer operate for 15-minute periods, any frost or ice that may build up during operating periods is given time to melt during the alternate non-operating periods. At any given moment, the continuously circulating fresh atmospheric air serves to simultaneously vaporize the volatile liquid in the operating side, and aid in the removal of frost and ice deposits or liquid condensate from the defrosting side. In this manner the frost and ice accumulation is automatically and periodically removed from the vaporized and a difficult operating problem is greatly minimized. As shown in detail in Fig. 3 of the drawings, the fin arrangement is such that a row is comprised of a plurality of smaller fins sections 60 (twelve are shown in the embodiment of the drawing). Four tubes pass through and are secured to each fin section in the embodiment shown in the drawings.

It has been found that, by providing fins of large area, effective heat transfer can be maintained from the atmospheric air to tubes 14 when operating under heavy frost and ice conditions. When smaller fins are employed they become completely covered with frost and ice and heat transfer is arrested.

It has also been found that, by providing an atmospheric vaporizer with fins and tubes exposed and arranged at the top in a horizontal position, defrosting is aided by the beneficial absorption of solar heat.

Fan 18 may be positioned either above or below the finned-tube assembly and may be of either the forced-draft or induced-draft types. It has, however, been found preferable to draw atmospheric air down through the finned-tubes thereby aiding in the removal of frost and ice deposits or liquid condensate from the fins and tubes.

It has been found that successive fins and tubes should be positioned sufficiently far apart to maintain internal atmospheric air passages through the vaporizer assembly even when the fins and tubes have frost and ice deposits thereon.

Atmospheric vaporizers in accordance with the present invention have successfully operated under very severe weather conditions. In one case a vaporizer, such as that shown in the embodiment of the drawings, having vaporization capacity of 25,000 C. F. H. and operating at pressures up to 2800 p. s. i., was installed in a liquid oxygen line at the discharge end of an immersion pump and successfully operated for a continuous four hour period until shut down. The ambient air temperature during this operation was between 36° F. and 44° F. and the relative humidity above about 83%. Frost and ice deposited on the fins and tubes but vaporization was not arrested. The alternate half sections of the vaporizer operated every other fifteen minutes during this operation.

What is claimed is:

1. Apparatus for continuously vaporizing to a gas at atmospheric temperature volatile liquids having boiling points below about 233° K. at atmospheric pressure comprising a plurality of spaced substantially parallel heat conducting fluid conduits, a plurality of substantially parallel spaced fins of heat conducting material secured in heat exchange contact with said plurality of heat conducting fluid conduits, inlet means including valve means and an inlet manifold at one end of said plurality of heat conducting fluid conduits positioned and arranged to divide said vaporizer into at least two substantially equal vaporizer sections to provide for vaporization of said volatile liquid in at least one of said sections while another of said sections is defrosting deposits of frost or ice, said valve means being adapted to alternate the path of flow of said volatile liquid from one section to another section of said vaporizer at regular intervals of time, and means for continuously forcing fresh atmospheric air through said vaporizer to simultaneously vaporize said volatile liquid in said one of said sections and remove said deposits of frost or ice from another section of said vaporizer.

2. An atmospheric vaporizer in accordance with claim 1, wherein said valve means consists of a three-way rotating valve.

3. An atmospheric vaporizer in accordance with claim 1, wherein at least some of said fluid conduits are horizontally disposed at the top of said vaporizer and exposed whereby a substantial portion of the outer surface of such fluid conduits is directly exposed to solar heat for defrosting thereby.

4. An atmospheric vaporizer in accordance with claim 1, wherein said fins of heat conducting material are of sufficiently large size to maintain an unfrosted heat conducting area at the tip of each of said fins when said fins contain heavy deposits of frost or ice.

5. An atmospheric vaporizer in accordance with claim 3, wherein said atmospheric air is drawn downwardly through said vaporizer thereby additionally accomplishing the removal of said deposits of frost or ice and liquid condensate from said fins and fluid conduits.

6. Apparatus for continuously vaporizing to a gas at atmospheric temperature at least one liquified gaseous component of air comprising a plurality of spaced substantially parallel heat conducting fluid conduits, a plurality of substantially parallel spaced fins of heat conducting material secured in heat exchange contact with said plurality of heat conducting fluid conduits, inlet means including flow directing valve means and an inlet manifold at one end of said plurality of heat conducting fluid conduits positioned and arranged to divide said vaporizer into at least two substantially equal vaporizer sections to provide for vaporization of said liquified gas in at least one of said sections while another of said sections is defrosting deposits of frost or ice, said valve means being adapted to alternate the path of flow of said liquified gas from one section to another section of said vaporizer at regular predetermined intervals of time, outlet manifold means at the opposite ends of said plurality of heat conducting fluid conduits, and means for drawing atmospheric air downwardly through said vaporizer to simultaneously vaporize the liquified gaseous component of air in said one of said sections and remove said deposits of frost or ice and liquid condensate from said fins and fluid conduits of another section of said vaporizer.

References Cited in the file of this patent

UNITED STATES PATENTS

| | | |
|---|---|---|
| 1,797,524 | Dwyer | Mar. 24, 1931 |
| 1,818,740 | Osborn | Aug. 11, 1931 |
| 1,894,692 | Kerr et al. | Jan. 17, 1933 |
| 2,110,430 | Swanson | Mar. 8, 1938 |
| 2,157,145 | Ridge | May 9, 1939 |
| 2,225,706 | Montgomery | Dec. 24, 1940 |
| 2,425,452 | Baars | Aug. 12, 1947 |
| 2,433,574 | Newton | Dec. 30, 1947 |
| 2,618,133 | Kennedy | Nov. 18, 1952 |